(12) United States Patent
Kim

(10) Patent No.: US 9,686,160 B2
(45) Date of Patent: *Jun. 20, 2017

(54) APPARATUS AND METHOD OF DISPLAYING STATUS OF WIRELESS NETWORK

(71) Applicant: Pantech Inc., Seoul (KR)

(72) Inventor: Jong Kuk Kim, Seoul (KR)

(73) Assignee: Pantech Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/864,220

(22) Filed: Sep. 24, 2015

(65) Prior Publication Data

US 2016/0013997 A1    Jan. 14, 2016

Related U.S. Application Data

(63) Continuation of application No. 14/011,128, filed on Aug. 27, 2013, now Pat. No. 9,148,810.

(30) Foreign Application Priority Data

Aug. 30, 2012    (KR) .................. 10-2012-0095516

(51) Int. Cl.
*H04W 4/00*    (2009.01)
*H04B 17/00*    (2015.01)
(Continued)

(52) U.S. Cl.
CPC .............. *H04L 43/045* (2013.01); *G09G 5/37* (2013.01); *G09G 5/377* (2013.01); *H04W 24/08* (2013.01)

(58) Field of Classification Search
CPC ......... H04L 43/045; H04L 24/08; H04L 5/37; H04L 5/377
(Continued)

(56) References Cited

U.S. PATENT DOCUMENTS

2002/0068600 A1*    6/2002   Chihara .................... 455/550
2006/0058057 A1*    3/2006   Holloway et al. ......... 455/550.1
(Continued)

FOREIGN PATENT DOCUMENTS

JP    2008-085513    4/2008
KR    10-2012-0070488    6/2012

OTHER PUBLICATIONS

IEEE, "IEEE Standard for Information technology—Telecommunications and information exchange between systems—Local and metropolitan area networks—Specific requirements," IEEE Std 802.11k-2008, Jun. 12, 2008, New York, NY 10016-5997, USA.

(Continued)

*Primary Examiner* — Thai Hoang
(74) *Attorney, Agent, or Firm* — H.C. Park & Associates, PLC

(57) ABSTRACT

A method for providing a status of a wireless network, including: receiving a wireless signal from an access point and status information of the access point; determining processing capacity information of the access point based on the status information of the access point; and displaying wireless network information with respect to the access point, the wireless network information including the processing capacity information of the access point and signal strength information of the received wireless signal.

20 Claims, 8 Drawing Sheets

(51) Int. Cl.
*H04L 12/26* (2006.01)
*H04W 24/08* (2009.01)
*G09G 5/37* (2006.01)
*G09G 5/377* (2006.01)

(58) Field of Classification Search
USPC ............... 370/329–330, 335–338, 342–348;
455/424–425, 450–454, 115.1–115.4,
455/226.1–226.4
See application file for complete search history.

(56) References Cited

U.S. PATENT DOCUMENTS

2006/0294247 A1* 12/2006 Hinckley et al. ............. 709/228
2009/0125429 A1* 5/2009 Takayama ....................... 705/35
2015/0057043 A1* 2/2015 Lei et al. ...................... 455/551

OTHER PUBLICATIONS

Notice of Allowance issued on May 28, 2015 in U.S. Appl. No. 14/011,128.

* cited by examiner

APPARATUS AND METHOD OF DISPLAYING STATUS OF WIRELESS NETWORK

CROSS-REFERENCE TO RELATED APPLICATIONS

This application is a continuation of U.S. patent application Ser. No. 14/011,128, filed on Aug. 27, 2013, and claims priority from and the benefit of Korean Patent Application No. 10-2012-0095516, filed on Aug. 30, 2012, which is hereby incorporated by reference for all purposes as if fully set forth herein.

BACKGROUND

Field

The present disclosure relates to an apparatus and method for determining and informing a status of a wireless network, and more particularly, to an apparatus and method for displaying a network status between a mobile communication terminal and an access point.

Discussion of the Background

Data processing and transmission speed, that is, an uploading/downloading speed, between a communication terminal and an access point may be unable to be recognized by a user from signal strength information displayed on a wireless communication terminal. Specifically, a conventional method of displaying the signal strength of a wireless fidelity (Wi-Fi) network may indicate the received signal strength indicator (RSSI) of a received signal without indicating actual data transmission speed between the communication terminal and the access point.

Also, although a high uploading/downloading speed is not guaranteed by strong signal strength of a Wi-Fi network in certain environments, users may have a misconception that the strong signal strength of the Wi-Fi network guarantees high uploading/downloading speed. Thus, many mobile communication terminal users may attempt accesses to the same access point that indicates the strongest signal strength and the access point may be accessed by too many users in a wireless network environment, such as a hot-spot of a wireless network.

Despite the strong signal strength of Wi-Fi, when the status of a wireless communication with an access point is poor due to frequent interruptions, and the like, a network communication with the access point may deteriorate. Specifically, the conventional method for displaying the signal strength of a Wi-Fi network may not be helpful to verify whether data is able to be transmitted efficiently via the Wi-Fi network when connected to the access point.

Accordingly, a Wi-Fi icon gauge displayed on a terminal may differ from data transmission capability and connectivity considerably since the status of the wireless network is displayed by indicating signal strength of a connected network alone without considering an environment that may have an influence on the network, such as, a processing capacity and frequency of interruption, and the like. Also, although the Wi-Fi icon gauge may indicate the signal strength of the received signal is strong (e.g., Wi-Fi icon gauge displays full signal strength), when a load is high due to many users connected to the identical access point, the network speed experienced by each of the users may not be proportional to the signal strength indicated by the Wi-Fi icon gauge.

Accordingly, there is a need for introducing a technology for reducing disruption among users by displaying the actual status of the wireless network along with information of signal strength.

SUMMARY

Exemplary embodiments of the present invention provide an apparatus and method for displaying a network status between a mobile communication terminal and an access point via an icon by indicating an uploading/downloading speed using a link speed between the mobile communication terminal and the access point or a channel load with respect to the access point.

Additional features of the invention will be set forth in the description which follows, and in part will be apparent from the description, or may be learned by practice of the invention.

Exemplary embodiments of the present invention provide a method for providing a status of a wireless network, including: receiving a wireless signal from an access point and status information of the access point; determining processing capacity information of the access point based on the status information of the access point; and displaying wireless network information with respect to the access point, the wireless network information including the processing capacity information of the access point and signal strength information of the received wireless signal.

Exemplary embodiments of the present invention provide an apparatus to provide a status of a wireless network, including: a wireless signal receiver to receive a wireless signal from an access point and status information of the access point; a processor configured to determine processing capacity information of the access point based on the status information of the access point; and a displaying unit to display wireless network information with respect to the access point, the wireless network information including the processing capacity information of the access point and signal strength information of the received wireless signal.

Exemplary embodiments of the present invention provide a non-transitory computer readable storage medium storing one or more programs for instructing a computer, when executed by a processor, to perform: receiving a wireless signal from an access point and status information of the access point; determining processing capacity information of the access point based on the status information of the access point; and displaying wireless network information with respect to the access point, the wireless network information including the processing capacity information of the access point and signal strength information of the received wireless signal.

Exemplary embodiments of the present invention provide a method for providing a status of a wireless network, including: receiving a wireless signal from an access point; determining a first network parameter and a second network parameter from the received wireless signal; and displaying an icon for indicating wireless network information with respect to the access point, the icon including a first indicator to display the first network parameter and a second indicator to display the second network parameter.

It is to be understood that both forgoing general descriptions and the following detailed description are exemplary and explanatory and are intended to provide further explanation of the invention as claimed. Other features and aspects will be apparent from the following detailed description, the drawings, and the claims.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF THE ILLUSTRATED EMBODIMENTS

Figure 1:
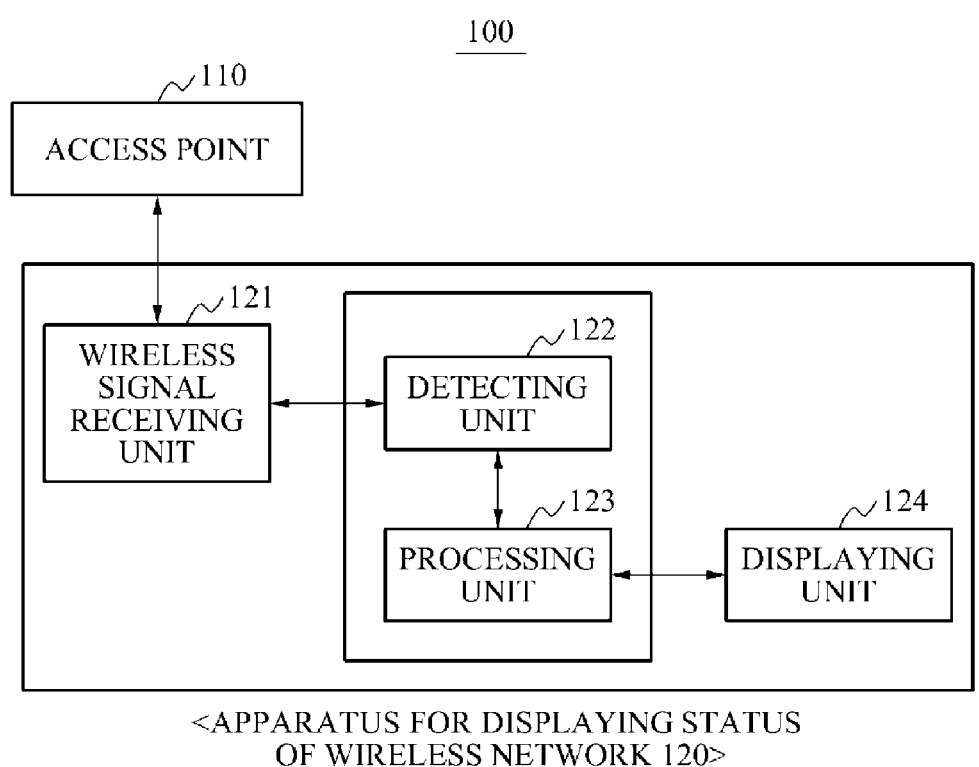
FIG. 1 is a diagram illustrating a wireless network in which an access point operates in conjunction with an apparatus for displaying a status of a wireless network according to an exemplary embodiment of the present invention.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element is referred to as being "connected to" another element, it can be directly connected to the other element, or intervening elements may be present.

When it is determined that a detailed description related to a related known function or configuration which may make the purpose of the present invention unnecessarily ambiguous in the description of the present invention, such detailed description will be omitted. Also, terminologies used herein are defined to appropriately describe the exemplary embodiments of the present invention and thus may be changed depending on a user, the intent of an operator, or a custom. Accordingly, the terminologies must be defined based on the following overall description of this specification.

FIG. 1 is a diagram illustrating a wireless network in which an access point 110 operates in conjunction with an apparatus 120 for displaying a status of a wireless network 100 according to an exemplary embodiment of the present invention.

The apparatus 120 for displaying the status of the wireless network may recognize the actual performance of a network and display the recognized performance of the network. The indication of the recognized performance of the network may be implemented via an icon that enables a user to recognize a processing capacity, a bandwidth, a transmission speed, a delay time, and the like, of a wireless network associated with the actual network performance recognized by the user.

The apparatus 120 may be implemented by software modules including program instructions to perform a method described herein and may be configured to be executed in a mobile communication terminal using one more processors, a storage device, a display screen, a communication interface, and other hardware components of the mobile communication terminal.

The apparatus 120 for displaying the status of the wireless network may include a wireless signal receiving unit 121, a detecting unit 122, a processing unit 123, and a displaying unit 124, and may display the actual status of the wireless network 100 between the apparatus 120 and the access point 110. The apparatus 120 may be a part of or a mobile communication or other terminal configured to communicate with the access point via wireless communication, such as a smartphone, a tablet computer, a laptop computer, a desktop computer, a television, a refrigerator, a laundry machine, and the like, or an embedded portion of the mobile communication or other terminal.

The apparatus 120 for displaying the status of the wireless network 100 may be embedded in a mobile communication terminal, and/or may be embodied as separate hardware components connected with the mobile communication terminal via a wired/wireless network connection.

The wireless signal receiving unit 121 may receive or obtain signal strength information of the access point and status information of the access point.

The wireless signal receiving unit 121 may detect or receive signal strength of the signal transmitted from the access point by measuring the signal strength, e.g., RSSI.

The detected or received signal strength may be measured in units of decibels (dB), and an antenna gain value on a receiving end may be measured to be about 6 to about 7 dB at maximum by a frequency band used according to Institute of Electrical and Electronics Engineers (IEEE) 802.11.

The wireless signal receiving unit 121 may use the received signal strength indicator (RSSI) to indicate a measured value of the signal strength.

Further, the wireless signal receiving unit 121 may receive the status information of the access point from the access point.

The wireless signal receiving unit 121 may receive the status information, and use the status information to verify a processing capacity of the current wireless network. The processing capacity may be associated with data processing speed, data transmission/reception speed, and/or data transmission error rate in a given time period.

For example, the wireless signal receiving unit 121 may receive a management frame including a beacon frame, a probe frame, and the like, as the status information. Further, the wireless signal receiving unit 121 may receive a packet transmission speed, a packet delay time with respect to the access point, and the like, as the status information.

The detecting unit 122 may detect or determine the processing capacity of the access point based on the received status information of the access point.

For example, the detecting unit 122 may detect the processing capacity of the wireless network with respect to the access point using the management frame, such as the beacon frame, the probe frame, and the like.

The IEEE establishes a set of standards IEEE 802.11k with regard to a wireless network radio resources management based on IEEE 802.11. An object of the set of standards is to exchange information between an access point and a mobile terminal or between an access point and another access point, and to select an access point having the most appropriate mobile node. IEEE Std 802.11k™-2008 (12 Jun. 2008), IEEE Standard for Information technology-Telecommunications and information exchange between systems-Local and metropolitan area networks-Specific requirements; Part 11: Wireless LAN Medium Access Control (MAC) and Physical Layer (PHY) Specifications; Amendment 1:Radio Resource Measurement of Wireless LANs, is incorporated herein by reference in its entirety.

IEEE 802.11k is defined to utilize the management frame among three frames, a control frame, a data frame, and the management frame.

The management frame may be divided into several types of actions based on a management type, such as a ready to send (RTS)/clear to send (CTS), a probe request/response, connection request/response, and the like, and IEEE 802.11k uses the several action types divided based on the management type.

IEEE 802.11k adds a new entry of a radio measurement category to a conventional action type category.

The newly added radio measurement category may request channel load information, noise histogram, location configuration information, and the like, and define an action of a radio measurement request/report used in response to the request.

Also, the newly added radio measurement category may request information, such as a received channel power indicator (RCPI) received for each antenna of a node, a received signal to noise indicator (RSNI), and the like, and define an action of link measurement request/report used in response to the request.

Further, the newly added radio measurement category may define an action of a neighbor report request/response used in requesting/responding to the information, such as the RCPI, the RSNI, and the like, for each antenna of the node, and the neighbor report request/response may be used in requesting for/responding to information of adjacent access points.

The wireless signal receiving unit 121 may receive various pieces of status information that may be used for determining the processing capacity of the wireless network with respect to the access point through the newly defined in IEEE 802.11k.

Accordingly, the detecting unit 122 may detect the processing capacity of the wireless network with respect to the access point using a packet transmission speed, a packet delay time with respect to the access point, and the like.

The wireless receiving unit 121 may verify the availability of the access point using the received status information.

For example, the wireless signal receiving unit 121 may verify at least one of a service set identifier (SSID) and a basic service set (BSS) from the received status information, and verify the availability of the access point.

If the access point is verified to be available, the wireless signal receiving unit 121 may request the access point for the status information of the access point, and receive the status information in response to the request.

The detecting unit 122 and the processing unit 123 may be provided with status information for calculating signal strength and/or a processing capacity obtained from the wireless signal receiving unit 121, and may generate processing capacity information prior to displaying wireless network status on a screen.

More particularly, the detecting unit 122 may determine the validity of status information of the access point, and, if the status information is determined to be valid, detect the processing capacity of the access point.

Also, the processing unit 123 may create processing capacity information indicating the status of the wireless network, based on at least one of the signal strength and the processing capacity.

The detecting unit 122 may verify the validity of information delivered from the wireless signal receiving unit 121.

The validity test may be configured according to an algorithm evaluating the processing capacity.

If the corresponding information is inappropriate data for generating a processing capacity, the signal strength may be used to indicate the status of the wireless network without using the processing capacity. Also, the processing unit 123 may create processing capacity information using the signal strength or may not create the processing capacity information.

The detecting unit 122 may detect a signal communicated between an access point and the apparatus 120, e.g, a mobile communication terminal, using the received status information. The processing unit 123 may calculate the value of the processing capacity based on a maximum link speed. The value of the processing capacity may be represented by a relative value with respect to other access points or a percentage of the full processing capacity to verify the current performance using the maximum link speed. The maximum link speed may correspond to the full processing capacity.

In particular, the processing unit 123 may calculate the processing capacity based on the detected signal and the status information of the corresponding access point, and create the processing capacity information, based on at least one of the processing capacity and the signal strength. The calculated processing capacity and/or the processing capacity information may be represented by a percentage value or a relative value with respect to other access points. The processing capacity information may be a portion of an icon to visually indicate the current processing capacity to a user.

Also, the processing unit 123 may deliver the created processing capacity information to the displaying unit 124.

The detecting unit 122 may verify a channel load value of the access point from the status information of the access point, and determine the processing capacity of the access point. The processing capacity of the access point may be determined from one or more parameters including the channel load value of the access point, a link speed, and the like.

The detecting unit 122 may measure the channel load value, based on configurations of IEEE 802.11k.

IEEE 802.11k employs an access method of carrier sense multiple access with collision avoidance (CSMA-CA), such that a plurality of nodes may conduct communication successfully using a single wireless medium. The CSMA-CA may support functions such as collision avoidance, maintaining a minimum distance between serial packets, and acknowledgement (ACK) packet subsequent to receiving data, through a random back-off method.

If the access method is used and communication is performed in accordance with IEEE 802.11 as described above, the detecting unit 122 may determine a channel load based on a ratio of an idle status to a busy status of a channel.

The idle status and the busy status of the channel may be calculated using a method of clear channel assessment, based on signal strength.

According to IEEE 802.11k, a terminal may request for channel load information through a format as shown in Table 1, and may reply through a format as shown in Table 2.

TABLE 1

| | Regulatory class | Channel number | Randomization interval | Measurement duration | opt |
|---|---|---|---|---|---|
| Octets: | 1 | 1 | 2 | 2 | Variable |

TABLE 2

| | Regulatory class | Channel number | Actual measurement start time | Measurement duration | Channel load | opt |
|---|---|---|---|---|---|---|
| Octets: | 1 | 1 | 8 | 2 | 1 | Variable |

The "regulatory class" indicates information that distinguishes different wireless frequency bands for each country, "channel number" indicates information of a channel to be measured, and "measurement duration" indicates information indicating a measurement time.

For reference, a time unit (TU) indicating the measurement duration may be represented by TU, and 1 TU may be defined as 1024 microseconds (μsec).

"Randomization interval" may indicate a back-off time that is set to avoid collision of nodes that receive a channel load request packet. The randomization interval may specify the upper bound of the random delay to be used prior to making the measurement as defined in IEEE 802.11k, and may be represented in units of TUs.

Using the information received as such, the detecting unit 122 may calculate a channel load through Equation 1.

$$\text{Channel Load} = \frac{\text{channel busy time}}{\text{measurement time}} \times 255 \qquad \text{[Equation 1]}$$

As used herein, "Channel Load" may denote a channel load, and "channel busy time" may denote a channel occupied time during which resources occupy a channel, which is distinct from an idle time of a channel, and "measurement time" may denote a measurement time or measurement duration. The channel busy time may refer to a time period during which the Carrier Sense mechanism has indicated a channel busy indication. Further, the channel load may be calculated as follows:

Channel load=Integer((Channel busytime/(MeasurementTime×k)×m)      [Equation 2]

Where k=1024, m=255. The scaling factors k and m may be changed according to different configurations.

After a mobile communication terminal has been connected to a specific access point, actual wireless data communication between the mobile communication terminal and the connected access point may be performed and actual data transmission speed may be measured. If the data transmission speed is obtained, the processing capacity may be represented by the data transmission speed instead of the channel load.

Accordingly, a processing capacity that may be calculated in an access point or the apparatus using a channel load value (x) of the access point may be measured as defined by Equation 2. The processing capacity may be represented by percentage.

$$\text{Processing Capacity (\%)} = 100 - \frac{100 \times \text{Channel Load}}{255} \qquad \text{[Equation 3]}$$

The displaying unit 124 may display the processing capacity information, which corresponds to the calculated processing capacity, on a screen of the apparatus 120, e.g., a mobile communication terminal. The displaying unit 124 may display processing capacity information that indicates a level of a processing capacity in an icon, and display signal strength information that indicates a level of received signal strength in the icon. In other words, the processing capacity information and the signal strength information may indicate a level of the corresponding parameter rather than the exact value in simplified visual information in the icon. However, throughout the specification, the display of the processing capacity information may be referred to as the display of the processing capacity, and the display of the signal strength information may be referred to as the display of the signal strength.

Further, the displaying unit 124 may create an icon indicating the processing capacity information.

Hereinafter, the icon will be described in detail with reference to FIG. 2 through FIG. 6.

Figure 2:
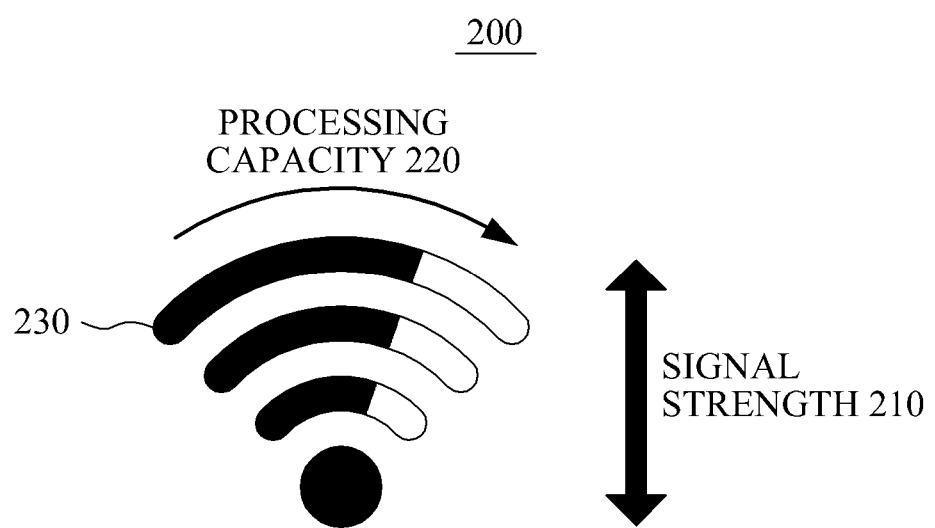
FIG. 2 is a diagram illustrating an icon created by an apparatus for displaying a status of a wireless network according to an exemplary embodiment of the present invention.

FIG. 2 is a diagram illustrating an icon 200 created by an apparatus for displaying a status of a wireless network according to an exemplary embodiment of the present invention. FIG. 2 will be described as if performed by the apparatus 120 shown in FIG. 1, but is not limited as such.

The apparatus 120 may create the icon 200 indicating the processing capacity information via the displaying unit 124.

The processing capacity information may include information with respect to signal strength and a processing capacity indicating an uploading/downloading speed or a channel load.

If the length of the last or upper arc 230 corresponds to "100", the displaying unit 124 may display a percentage value, e.g., a percentage of the maximum link speed or maximum processing capacity, and generate the icon 200 to display the processing capacity of the access point by filling inside of an arc of an antenna icon.

The displaying unit 124 may display the processing capacity in units of a predetermined percentage value by determining an incremental unit to be 1%, 5%, 25% and the like, to indicate a percentage value of the processing capacity by filling the inside of each arc of the icon 200 according to the incremental unit. For example, the processing capacity may be represented by 0%, 25%, 50%, 75%, and 100% ("5 levels") if the incremental unit is 25%. Also, each arc gauge may be represented in units of 25%. However, to properly indicate signal strength when processing capacity corresponds to the lowest level, e.g. 0%, each arc may be filled with the color with a certain minimum length. Thus, a user may not misinterpret that the signal strength is very low by recognizing the partially filled arcs when signal strength is high and the processing capacity is in the lowest level.

The displaying unit 124 may indicate received signal strength 210 using the number of arcs. An arc of the Wi-Fi icon may be filled with a color indicating that signal strength is greater than or equal to a certain level or may be blank if the signal strength is less than the certain level. Each arc may represent different levels of signal strength. For example, the last or upper arc 230 of the icon 200 may correspond to higher level of signal strength than other lower arcs. The number of arcs partially or entirely filled with the color may be proportional to the received signal strength. For example, if all the arcs of the icon 200 are partially or entirely filled with the color, it may indicate received signal strength is strong enough to process the received signal with full capacity.

Also, the displaying unit 124 may display a percentage value of the calculated processing capacity 200 along with the signal strength 210. As shown in FIG. 2, the degree of processing capacity may be displayed by the color displayed inside the arc of the icon 200. The degree of processing capacity may be indicated by the ratio of the color filled in the gauge of each arc. Specifically, each arc may be a gauge for indicating the degree of the processing capacity. If each arc is entirely filled with the color, the degree of the processing capacity corresponds to 100% level. If each arc is partially filled with the color with the certain minimum length, the processing capacity corresponds to 0% level.

Further, the displaying unit 124 may display the signal strength using at least one arc, and display the processing capacity using at least one of a color, a chroma, and a brightness of the arc.

Figure 3:
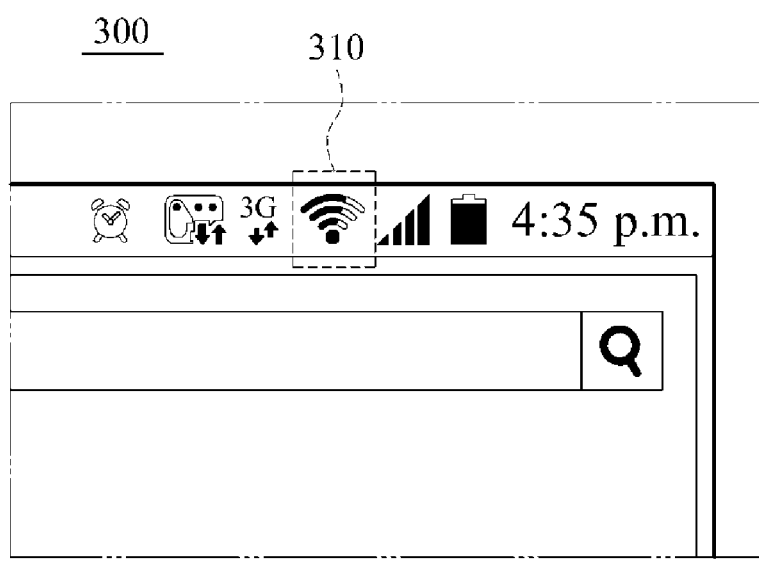
FIG. 3 is a diagram illustrating a screen of a mobile communication terminal displaying an icon for indicating a status of a wireless network according to an exemplary embodiment of the present invention.

FIG. 3 is a diagram illustrating a screen 300 of a mobile communication terminal displaying an icon for indicating a status of a wireless network according to an exemplary embodiment of the present invention. FIG. 3 will be described as if performed by the apparatus 120 shown in FIG. 1, but is not limited as such.

On one end of the screen 300 of the mobile communication terminal, an icon 310 created or generated based on the processing capacity information may be displayed.

As shown in FIG. 3, the icon 310 may be displayed on the top edge of a screen in which various device state information is displayed. The display location may be a position of a gauge displaying conventional Wi-Fi icons.

Figure 4:
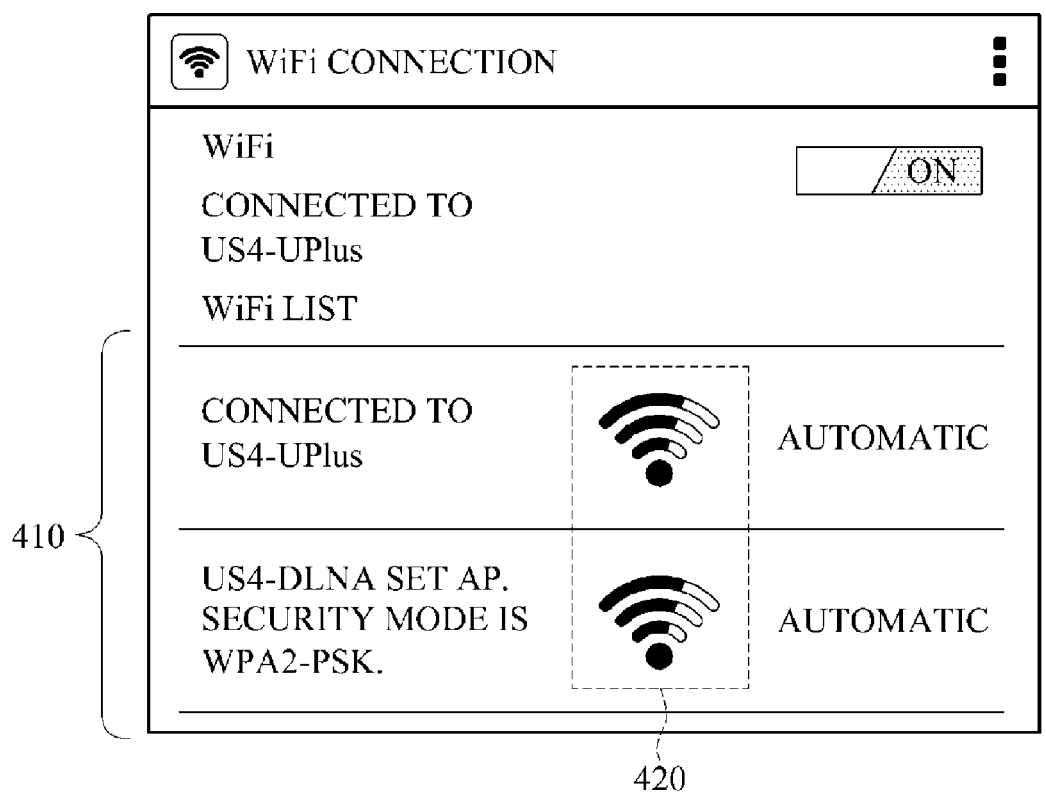
FIG. 4 is a diagram illustrating a list of identified access points and a status of a wireless network of each identified access point according to an exemplary embodiment of the present invention.

FIG. 4 is a diagram illustrating a list 410 of identified access points and a status of a wireless network of each identified access points according to an exemplary embodiment of the present invention. FIG. 4 will be described as if performed by the apparatus 120 shown in FIG. 1, but is not limited as such.

An exemplary scanning process of detecting an access point is described in IEEE 802.11k in detail.

The mobile communication terminal may display the list 410 of the identified access points.

Here, the apparatus 120 may display processing capacity information for each identified access point.

The apparatus 120 may create icons 420 corresponding to the processing capacity information for each access point via the displaying unit 124, and control the mobile communication terminal to display the created icons 420 at a position corresponding to each of the access points.

The apparatus 120 may allow a user to determine an access point that provides both higher received signal strength and processing capacity by displaying the two status parameters of a network between a mobile communication terminal and an access point in one icon.

Also, the apparatus may be able to perform a passive load balancing by selecting an access point having relatively higher signal strength and processing capacity among a plurality of identified wireless networks, e.g., access points. Specifically, if the access point having the greatest signal strength has relatively lower actual processing capacity, the access point may not be listed as the highest priority and another access point having relatively lower signal strength and having higher processing capacity may be recommended with higher priority. Thus, users may be distributed among a group of access points having higher signal strength, and the processing capacity deterioration for an access network due to excessive connection requests may be reduced.

Also, the apparatus may provide a fast data transmitting/receiving service to a user by allowing the user to select an access point having an excellent actual processing capacity by displaying the status of a wireless network with respect to the access point, based on at least one of signal strength and a processing capacity.

Further, identified access points may be sorted based on the signal strength and the processing capacity. For example, the access points may be sorted according to the signal strength, e.g., from access points providing the highest signal strength to access points providing the lowest signal strength. Then, each group of access points providing the same level of signal strength may be sorted according to the processing capacity, e.g., from access points providing the highest processing capacity to access points providing the lowest processing capacity. Further, a weighted sum may be calculated based on the two parameters. For example, a weighted sum calculated based on the signal strength and the processing capacity may be used to prioritize the access points and sort the access points according to the priority. According to the exemplary embodiments, users may access to an access point automatically based on the priority in a crowded wireless environment in which many wireless communication devices attempt to access wireless network via an access point and a plurality of access points are provided for the wireless communication devices.

Figure 5:
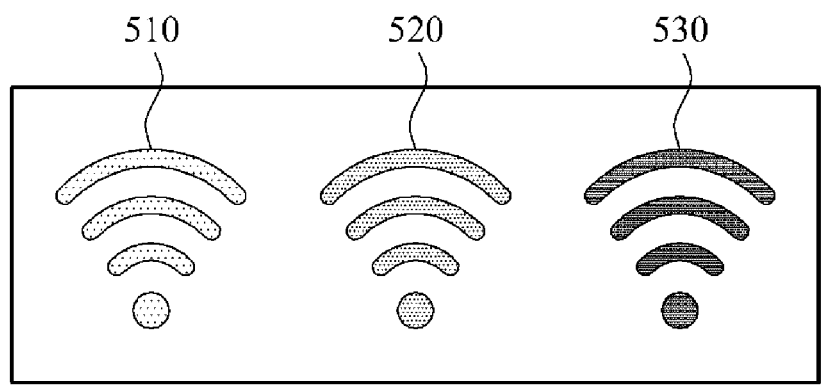
FIG. 5 and FIG. 6 are diagrams illustrating an example of an icon indicating signal strength and a processing capacity according to an exemplary embodiment of the present invention.
Figure 6:
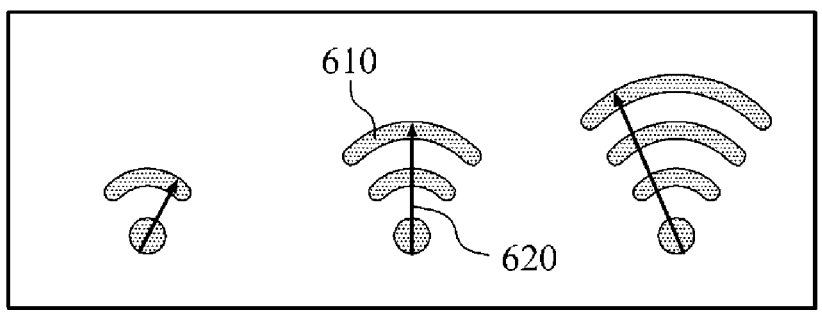

FIG. 5 and FIG. 6 are diagrams illustrating an example of an icon indicating signal strength and a processing capacity according to an exemplary embodiment of the present invention. FIG. 5 and FIG. 6 will be described as if performed by the apparatus 120 shown in FIG. 1, but is not limited as such.

The displaying unit 124 may display the signal strength using at least one arc, and display the processing capacity using a characteristic of an arc, e.g., at least one of a color, a chroma, and a brightness of the arc.

Referring to FIG. 5, an icon 510 and an icon 530 indicates the same level of signal strength represented by the same number of arcs. However, the icon 530 may be displayed to be darker than the icon 510, based on a difference of one of a color, a chroma, and a brightness representing the icon 510 and the icon 530, and the darker icon 530 may indicate a relatively greater processing capacity than the icon 510.

An icon 520 may indicate a processing capacity higher than the processing capacity of the icon 510 and lower than the processing capacity of the icon 530.

The displaying unit 124 may display the processing capacity by creating a first icon displaying the signal strength using at least one arc and a second icon that overlaps the first icon at a position corresponding to a position of the at least one arc.

As shown in FIG. 6, the first icon may indicate an icon displayed by arcs 610, and the second icon may indicate an arrow 620 that overlaps the arcs, for example, the first icon.

For example, the signal strength of the wireless network may be represented based on the number of the arcs 610, and the processing capacity of the wireless network may be represented by the location of the arrow 620 overlapped on the arcs.

Further, various parameters associated with the status of a wireless network may be represented by the icon illustrated in FIG. 2 through FIG. 6. For example, at least one of a bandwidth, a channel load, a transmission delay time, and the like may be represented by the icon along with the signal strength level.

The units described herein, e.g., wireless signal receiving unit 121, detecting unit 122, processing unit 123, and displaying unit 124 may be implemented using hardware components, software components, or a combination thereof. For example, a processing device may be implemented using one or more general-purpose or special purpose computers, such as, for example, a processor, a controller and an arithmetic logic unit (ALU), a digital signal processor, a microcomputer, a field programmable array (FPA), a programmable logic unit (PLU), a microprocessor or any other device capable of responding to and executing instructions in a defined manner. The processing device may run an operating system (OS) and one or more software applications that run on the OS. The processing device may access, store, manipulate, process, and create data in response to execution of the software. For purpose of simplicity, the description of a processing device is used as singular; however, one skilled in the art would appreciate that a processing device may include multiple processing elements and multiple types of processing elements. For example, a processing device may include multiple processors or a processor and a controller. In addition, different processing configurations are possible, such as parallel processors.

Figure 7:
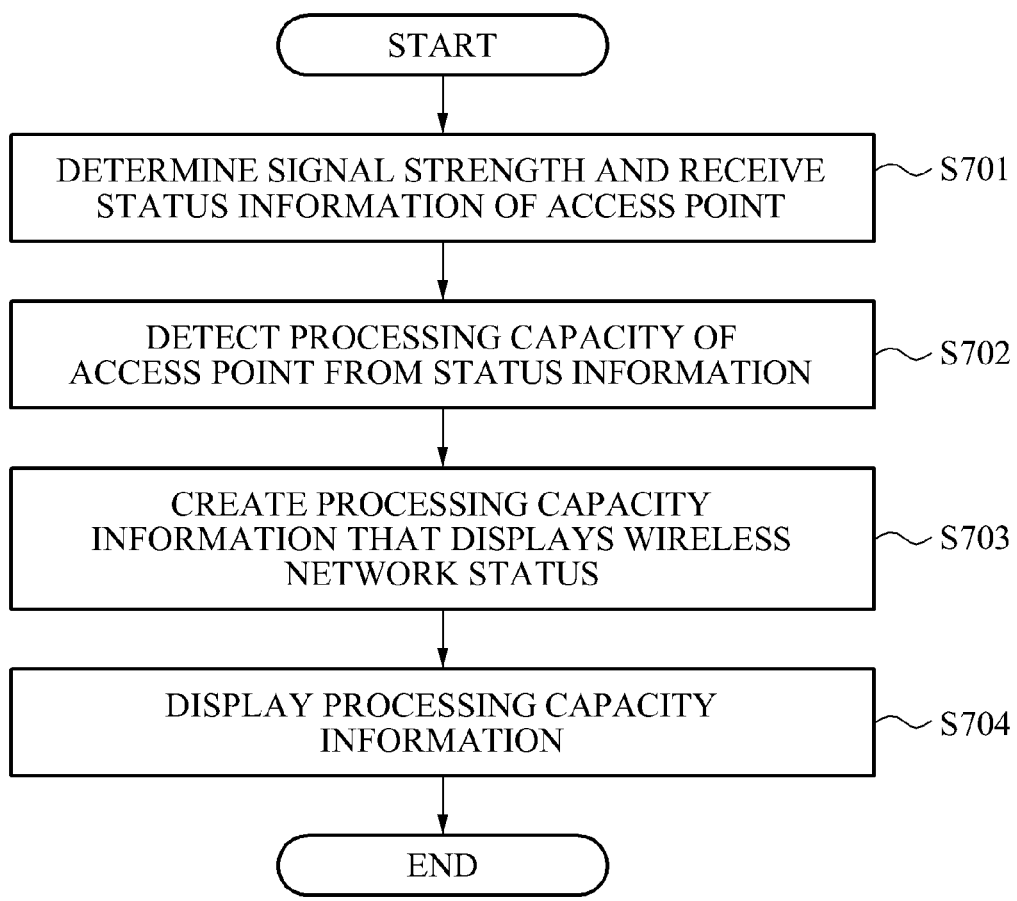
FIG. 7 is a flowchart illustrating a method for displaying a status of a wireless network according to an exemplary embodiment of the present invention.

FIG. 7 is a flowchart illustrating a method for displaying a status of a wireless network according to an exemplary embodiment of the present invention. FIG. 7 will be described as if performed by the apparatus 120 shown in FIG. 1, but is not limited as such.

In operation S701, a mobile communication terminal may receive or determine signal strength of a signal transmitted from the access point and status information of the access point in order to display the status of the wireless network between the mobile communication terminal and the access point.

In operation S702, the mobile communication terminal may detect a processing capacity of the access point from the received status of the access point.

For example, the mobile communication terminal may verify the availability of the access point using the received status information.

Subsequently, if the access point is verified to be available, the mobile communication terminal may detect the processing capacity of the access point.

Further, the mobile communication terminal may determine the validity of the received status information of the access point, and if the received status information of the access point is determined to be valid, the processing capacity of the access point may be detected in operation S702.

The mobile communication terminal may verify a channel load value of the access point from the status information of the access point, and calculate the processing capacity of the access point based on the channel load value.

In operation S703, the mobile communication terminal may create processing capacity information that indicates the status of the wireless network based on at least one of the signal strength and the processing capacity.

In operation S704, the mobile communication terminal may display the processing capacity information on a screen of the mobile communication terminal.

The mobile communication terminal may create an icon, and display the processing capacity information via the created icon on the screen of the mobile communication terminal.

The icon may indicate information that displays the signal strength using at least one arc, and displays the processing capacity using at least one of a color, a chroma, and a brightness of the arc.

As another example, the mobile communication terminal may create a first icon displaying the signal strength using the number of the arcs and create a second icon that overlaps the first icon at a position corresponding to a position of at least one arc using the at least one arc in order to display the processing capacity information on the screen of the mobile communication terminal.

Further, the mobile communication terminal may display the signal strength using the created first icon, and display the processing capacity using the created second icon.

Figure 8:
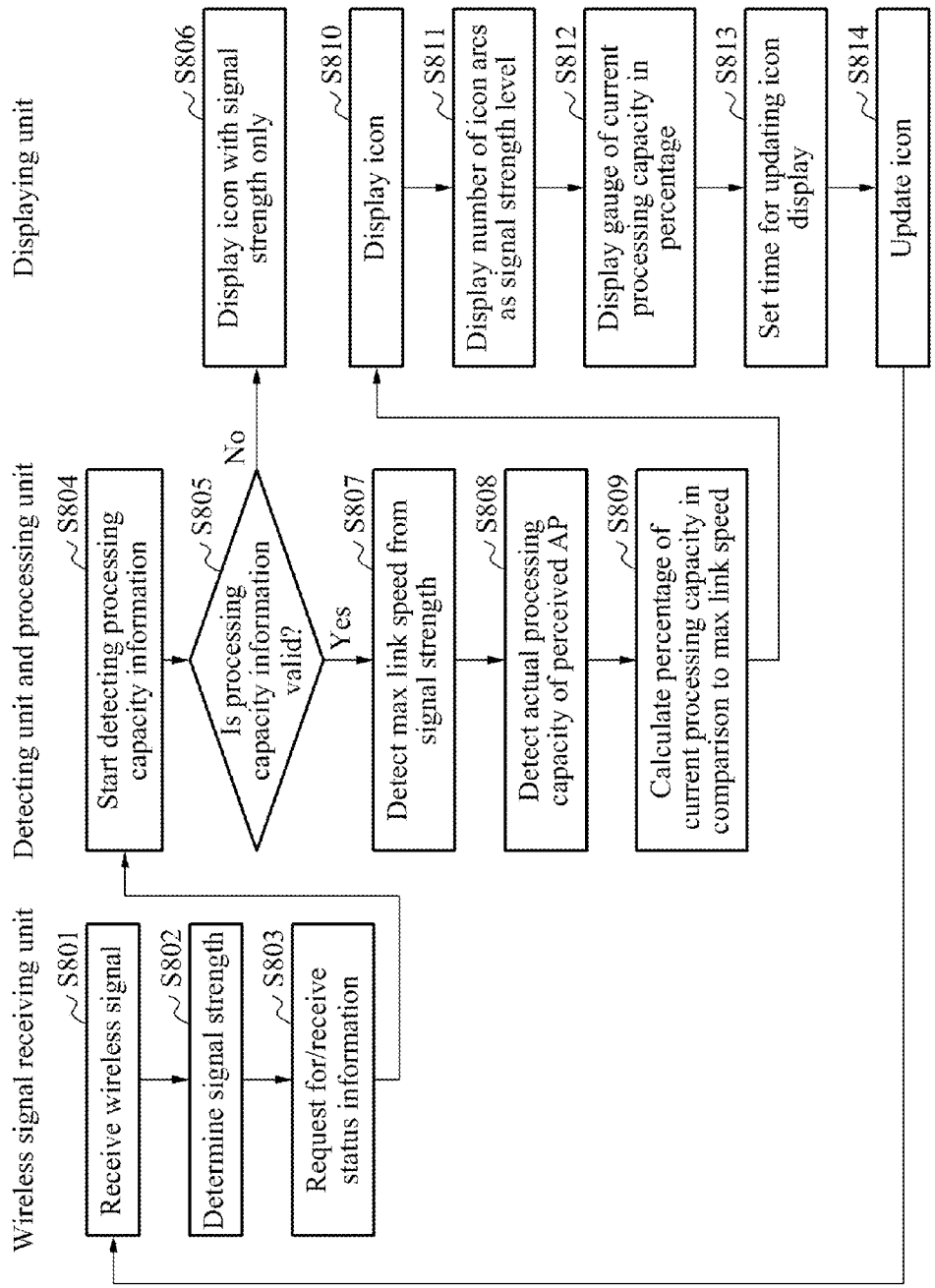
FIG. 8 is a flowchart illustrating a method for displaying a status of a wireless network with respect to each access point according to an exemplary embodiment of the present invention.

FIG. 8 is a flowchart illustrating a method for displaying a status of a wireless network with respect to each access point according to an exemplary embodiment of the present invention. FIG. 8 will be described as if performed by the apparatus 120 shown in FIG. 1, but is not limited as such.

In operation S801, a wireless signal receiving unit may receive a wireless signal from an access point.

In operation S802, the wireless signal receiving unit may determine signal strength of the received wireless signal.

In operation S803, the wireless signal receiving unit may request the access point status information and receive the requested status information so as to obtain a frame and a packet associated with the processing capacity from the frame included in the received wireless signal.

In operation S804, a detecting unit/processing unit may start a process for detecting information associated with the processing capacity from the received status information. The information associated with the processing capacity may be the channel load.

In operation S805, the detecting unit/processing unit may determine the validity of the received status information for determining the processing capacity.

In operation S807, the detecting unit/processing unit may detect the maximum link speed from the signal strength of the received signal if it is determined that the received status information is valid as determined in the operation S805. In operation S806, an icon for indicating the status of a wireless network may be displayed to indicate the signal strength of the received signal without indicating the processing capacity of the corresponding access point if it is determined that the received status information is not valid as determined in the operation S805.

In operation S808, the detecting unit/processing unit may detect the actual processing capacity of the access point perceived using the maximum link speed detected in operation S807.

In operation S809, the detecting unit/processing unit may calculate the current processing capacity. The current processing capacity may be calculated as a percentage value of the processing capacity value associated with the maximum of the link speed.

In operation S810, a displaying unit 124 may display an icon to indicate the current processing capacity.

In operation S811, the displaying unit 124 may indicate signal strength level as the number of arcs of the icon, and in operation S812, the displaying unit 124 may display a gauge in at least one arc to indicate the current processing capacity as a percentage value of the processing capacity corresponding to the maximum link speed.

In operation S813, the displaying unit 124 may set a time for updating the icon, and in operation S814, the apparatus may update the icon display by reflecting changed channel status of the wireless network.

According to an exemplary embodiment of the present invention, it may be possible to allow a user to determine an access point having relatively higher signal strength and processing capacity by displaying the two status parameters of the network between a mobile communication terminal and the access point.

Further, it may be possible to detect access points showing decent signal strength but having poor processing capacity and/or signal quality due to an obstacle and interruption, and to avoid such access points.

Further, the user may be able to use a fast data transmitting/receiving service by selecting an access point having higher processing capacity based on both signal strength and the processing capacity.

According to an exemplary embodiment of the present invention, passive load balancing may be attained by selecting an access point having greater signal strength as well as higher processing capacity from among a plurality of identified networks. For example, load balancing at the current position may be attained by allowing users to select an access point having a high data transmission speed at the current position indicated by higher processing capacity.

The exemplary embodiments according to the present invention may be implemented by one or more programs recorded in computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of computer-readable media include magnetic media such as hard disks, floppy disks, and magnetic tape; optical media, such as CD ROM discs and DVD; magneto-optical media such as floptical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method for providing a status of a wireless network, comprising:
   receiving a wireless signal from an access point and status information of the access point;
   determining processing capacity information of the access point based on the status information of the access point; and
   displaying wireless network information with respect to the access point, the wireless network information comprising the processing capacity information of the access point and signal strength information of the received wireless signal,
   wherein the signal strength information of the received wireless signal and the processing capacity information of the access point are displayed together in a graphic object.

2. The method of claim 1, wherein the wireless signal comprises the status information, and the status information comprises a channel load of the access point.

3. The method of claim 1, further comprising:
   determining signal strength of the wireless signal;
   determining a processing capacity based on the status information; and
   creating an icon for displaying the wireless network information, the icon corresponding to the graphic object,
   wherein the icon is configured to indicate a level of the processing capacity as the processing capacity information, and configured to indicate a level of the signal strength as the signal strength information.

4. The method of claim 3, wherein the level of the signal strength is configured to be indicated by a number of arcs in the icon.

5. The method of claim 3, wherein the level of the processing capacity is configured to be indicated by a length of an arc in the icon.

6. The method of claim 1, wherein the processing capacity of the access point is configured to be represented by at least one of a color, a length, brightness, and an arrow indicator in the graphic object.

7. The method of claim 1, further comprising:
   identifying one or more available access points;
   determining wireless network information for each of the identified access points;
   sorting the identified access points based on wireless network information of the identified access points; and
   displaying a list of the sorted access points.

8. The method of claim 1, wherein the processing capacity information is determined based on a channel load included in the status information or a data transmission speed with respect to the access point.

9. An apparatus to provide a status of a wireless network, comprising:
   a wireless signal receiver to receive a wireless signal from an access point and status information of the access point;

a processor configured to determine processing capacity information of the access point based on the status information of the access point; and a displaying unit to display wireless network information with respect to the access point, the wireless network information comprising the processing capacity information of the access point and signal strength information of the received wireless signal, wherein the signal strength information of the received wireless signal and the processing capacity information of the access point are displayed together in a graphic object.

10. The apparatus of claim 9, wherein the wireless signal comprises the status information, and the status information comprises a channel load of the access point.

11. The apparatus of claim 9, wherein the processor is configured to determine signal strength of the wireless signal, configured to determine a processing capacity based on the status information, and configured to create an icon for displaying the wireless network information, the icon corresponding to the graphic object, wherein the icon is configured to indicate a level of the processing capacity as the processing capacity information, and configured to indicate a level of the signal strength as the signal strength information.

12. The apparatus of claim 11, wherein the level of the signal strength is configured to be indicated by a number of arcs in the icon.

13. The apparatus of claim 11, wherein the level of the processing capacity is configured to be indicated by a length of an arc in the icon.

14. The apparatus of claim 9, wherein the processing capacity of the access point is configured to be represented by at least one of a color, a length, brightness, and an arrow indicator in the graphic object.

15. The apparatus of claim 9, wherein the processor is configured to identify one or more available access points if the wireless signal receiver receives wireless signals from the one or more available access points, configured to determine wireless network information for each of the identified access points, configured to sort the identified access points based on wireless network information of the identified access points, and configured to display a list of the sorted access points.

16. The apparatus of claim 9, wherein the processing capacity information is determined based on a channel load included in the status information or a data transmission speed with respect to the access point.

17. A method for providing a status of a wireless network, comprising:

receiving a wireless signal from an access point and status information of the access point;

determining processing capacity information of the access point based on the status information of the access point; and displaying wireless network information with respect to the access point, the wireless network information comprising the processing capacity information of the access point and signal strength information of the received wireless signal, wherein the signal strength information of the received wireless signal is displayed in a first graphic object, and the processing capacity information of the access point is displayed in a second graphic object.

18. The method of claim 17, wherein the first graphic object comprises a number of arcs, and the second graphic object comprises an indicator configured to move along a lengthwise direction of the arcs.

19. The method of claim 18, wherein the indicator is configured to move according to the processing capacity information of the access point.

20. The method of claim 17, wherein the first graphic object overlaps with the second graphic object.

* * * * *